(12) United States Patent
Singh et al.

(10) Patent No.: US 11,170,435 B2
(45) Date of Patent: Nov. 9, 2021

(54) OFFER PERSONALIZATION ENGINE FOR TARGETED MARKETING OF BRANDED CONSUMER PACKAGED GOODS

(71) Applicant: Catalina Marketing Corporation, St. Petersburg, FL (US)

(72) Inventors: Zubin Singh, Palo Alto, CA (US); Benjamin S. Sprecher, Waban, MA (US); Ankur Agarwal, Sunnyvale, CA (US); Mykola Markov, San Jose, CA (US); Kirk Dikun, Tampa, FL (US); Tony Mou, St. Petersburg, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 522 days.

(21) Appl. No.: 15/879,991

(22) Filed: Jan. 25, 2018

(65) Prior Publication Data

US 2018/0336625 A1 Nov. 22, 2018

Related U.S. Application Data

(60) Provisional application No. 62/507,113, filed on May 16, 2017, provisional application No. 62/507,116, filed on May 16, 2017.

(51) Int. Cl.
*G06Q 30/00* (2012.01)
*G06Q 30/08* (2012.01)
*G06Q 30/02* (2012.01)

(52) U.S. Cl.
CPC ......... *G06Q 30/08* (2013.01); *G06Q 30/0226* (2013.01)

(58) Field of Classification Search
CPC ........................ G06Q 30/08; G06Q 30/0226
See application file for complete search history.

(56) References Cited

U.S. PATENT DOCUMENTS

| 8,131,594 B1 | 3/2012 | Yenoshua et al. |
| 11,037,138 B2 * | 6/2021 | Theurer ................. G06Q 20/36 |

(Continued)

OTHER PUBLICATIONS

Kumar, Manoj, et al. "Sales promotions on the Internet." 3rd USENIX Workshop on Electronic Commerce. 1998.*

(Continued)

*Primary Examiner* — Kathleen Palavecino
(74) *Attorney, Agent, or Firm* — McDermott Will & Emery LLP

(57) ABSTRACT

A method including receiving a digital promotion payload from a brand manufacturer for at least one branded consumer packaged good, the digital promotion payload including a digital promotion value associated with the branded consumer packaged good, is provided. The method includes receiving a bid request to the digital promotion engine, providing a bid response to the bid request, the bid response including the digital promotion payload, and receiving, from the supply side platform, a confirmation that the bid response has been selected from one or more bids from different digital advertising entities. The method includes providing a command to the supply side platform to deliver the digital promotion payload to a mobile device accessing a resource from the mobile display publisher, and loading the digital promotion value to a frequent shopper identification in response to a consumer interaction with the digital promotion payload detected from the mobile device.

14 Claims, 8 Drawing Sheets

(56) References Cited

U.S. PATENT DOCUMENTS

| | | |
|---|---|---|
| 2006/0091203 A1 | 5/2006 | Bakker et al. |
| 2009/0037279 A1 | 2/2009 | Chockalingham et al. |
| 2011/0015987 A1 | 1/2011 | Chakraborty et al. |
| 2011/0231264 A1 | 9/2011 | Dilling et al. |
| 2012/0072270 A1 | 3/2012 | Waylonis et al. |
| 2012/0221404 A1 | 8/2012 | Ahmed et al. |
| 2012/0303463 A1 | 11/2012 | Stephens et al. |
| 2014/0180808 A1* | 6/2014 | Boal ............... G06Q 30/0245 705/14.53 |
| 2014/0229277 A1 | 8/2014 | Khambete et al. |
| 2014/0337098 A1 | 11/2014 | Ganesh |
| 2014/0379480 A1 | 12/2014 | Rao et al. |
| 2015/0112788 A1 | 4/2015 | Kim |
| 2015/0220914 A1* | 8/2015 | Purves ............... G06Q 20/36 705/26.8 |
| 2015/0262232 A1 | 9/2015 | Klein et al. |
| 2015/0332311 A1 | 11/2015 | Patel et al. |
| 2016/0071115 A1 | 3/2016 | Oh |
| 2016/0225029 A1 | 8/2016 | VanDeVelde |
| 2016/0292731 A1 | 10/2016 | Khwaja |

OTHER PUBLICATIONS

Office Action dated Apr. 3, 2020 in related U.S. Appl. No. 15/880,041.
International Search Report for PCT/US2018/032448, dated Oct. 19, 2018, 4 pages.
International Search Report and Written Opinion from International Patent Application No. PCT/US2018/032449, 11 pages, dated Sep. 17, 2018.
Final Office Action dated Nov. 27, 2020 in related U.S. Appl. No. 15/880,041.
Extended European Search Report dated Sep. 23, 2020 in corresponding European Application No. 18801823.8.
Extended European Search Report dated Dec. 21, 2020 in corresponding European Application No. 18802950.8.
USPTO, Final Office Action dated Nov. 27, 2020, for related U.S. Appl. No. 15/880,041; 18 pgs.

* cited by examiner

OFFER PERSONALIZATION ENGINE FOR TARGETED MARKETING OF BRANDED CONSUMER PACKAGED GOODS

CROSS-REFERENCE TO RELATED APPLICATIONS

The present disclosure is related to and claims priority under 35 U.S.C. § 119(e) of U.S. Provisional Patent Application No. 62/507,113, entitled "OFFER PERSONALIZATION ENGINE FOR TARGETED MARKETING OF CONSUMER PACKAGED GOODS," by Zubin SINGH et-al, and to U.S. Provisional Patent Application No. 62/507,116, entitled "OFFER PERSONALIZATION ENGINE FOR TARGETED MARKETING OF BRANDED CONSUMER PACKAGED GOODS," by Zubin SINGH et-al, both applications filed on May 16, 2017, and the contents of both applications are hereby incorporated by reference in their entirety, for all purposes.

BACKGROUND

Field

The present disclosure generally relates to the personalized delivery of brand consumer packaged goods (CPGs)-based digital promotion content through digital promotions via mobile and desktop computer devices.

Description of the Related Art

CPG brands lose about one-third of their consumers every year due mainly to the inefficient advertising techniques typically oriented towards market segmentation through demographics. To improve efficiency, marketing tools available today involve a trade-off between sophistication, selectivity, scalability, and accessibility (e.g., mobile, online, or in store). However, many of the marketing tools available today require a consumer to log in to a retailer web page or mobile application in order to actively search for a digital promotion, or a coupon. In addition, traditional marketing tools require additional steps to clip the digital promotion or coupon to a frequent shopper identification or loyalty rewards card associated with a consumer.

SUMMARY

In one embodiment of the present disclosure, a computer-implemented method is described for receiving, in a digital promotion engine, a digital promotion payload from a brand manufacturer for at least one branded consumer packaged good, the digital promotion payload including a digital promotion value associated with the branded consumer packaged good. The computer-implemented method includes receiving, from a supply side platform of a mobile display publisher, a bid request to the digital promotion engine, providing, to the supply side platform, a bid response to the bid request, the bid response including the digital promotion payload, and receiving, from the supply side platform, a confirmation that the bid response has been selected after conducting an auction for one or more bids from different digital advertising entities. The computer-implemented method also includes providing a command to the supply side platform to deliver the digital promotion payload to a mobile device accessing a resource from the mobile display publisher, and loading the digital promotion value to a frequent shopper identification in response to a consumer interaction with the digital promotion payload detected from the mobile device.

According to one embodiment, a system is described that includes one or more processors and a memory coupled with the one or more processors, the memory including instructions that, when executed by the one or more processors, cause the one or more processors to receive, in a digital promotion engine, a digital promotion payload from a brand manufacturer for at least one branded consumer packaged good, the digital promotion payload including a digital promotion value associated with the branded consumer packaged good. The one or more processors also execute instructions to receive, from a supply side platform of a mobile display publisher, a bid request to the digital promotion engine, to provide, to the supply side platform, a bid response to the bid request, the bid response including the digital promotion payload, and to receive, from the supply side platform, a confirmation that the bid response has been selected after conducting an auction for one or more bids from different digital advertising entities. The one or more processors also execute instructions to provide a command to the supply side platform to deliver the digital promotion payload to a mobile device accessing a resource from the mobile display publisher, and to load the digital promotion value to a frequent shopper identification in response to a consumer interaction with the digital promotion payload detected from the mobile device.

According to one embodiment, a non-transitory, machine readable medium is described that includes instructions, which when executed by one or more processors, cause a computer to perform a method that includes receiving, in a digital promotion engine, a digital promotion payload from a brand manufacturer for at least one branded consumer packaged good, the digital promotion payload including a digital promotion value associated with the branded consumer packaged good. The method also includes receiving, from a supply side platform of a mobile display publisher, a bid request to the digital promotion engine, and providing, to the supply side platform, a bid response to the bid request, the bid response including the digital promotion payload. The method also includes receiving, from the supply side platform, a confirmation that the bid response has been selected after conducting an auction for one or more bids from different digital advertising entities, providing a command to the supply side platform to deliver the digital promotion payload to a mobile device accessing a resource from the mobile display publisher, and loading the digital promotion value to a frequent shopper identification in response to a consumer interaction with the digital promotion payload detected from the mobile device.

In yet other embodiment, a system is described that includes a means for storing commands and a means for executing the commands causing the system to perform a method that includes receiving, in a digital promotion engine, a digital promotion payload from a brand manufacturer for at least one branded consumer packaged good, the digital promotion payload including a digital promotion value associated with the branded consumer packaged good. The method also includes receiving, from a supply side platform of a mobile display publisher, a bid request to the digital promotion engine, and providing, to the supply side platform, a bid response to the bid request, the bid response including the digital promotion payload. The method also includes receiving, from the supply side platform, a confirmation that the bid response has been selected after conducting an auction for one or more bids from different digital advertising entities, providing a command to the supply side platform to deliver the digital promotion payload to a mobile device accessing a resource from the mobile display publisher, and loading the digital promotion value to a frequent shopper identification in response to a consumer interaction with the digital promotion payload detected from the mobile device.

In a further embodiment, a computer-implemented method is described for determining a mobile device identifier from a publisher website or application accessed by a browser in a mobile device. The method includes providing the mobile device identifier to a digital promotion engine, correlating in a lookup table in the digital promotion engine the mobile device identifier with a frequent shopper card, and receiving, after a logic query for the frequent shopper card, a digital promotion payload including a digital promotion value for a branded consumer packaged good. The method also includes rendering, in a display of the mobile device, via the browser, the digital promotion payload and loading the digital promotion value to the frequent shopper card in response to a user interaction with the digital promotion payload detected from the mobile device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
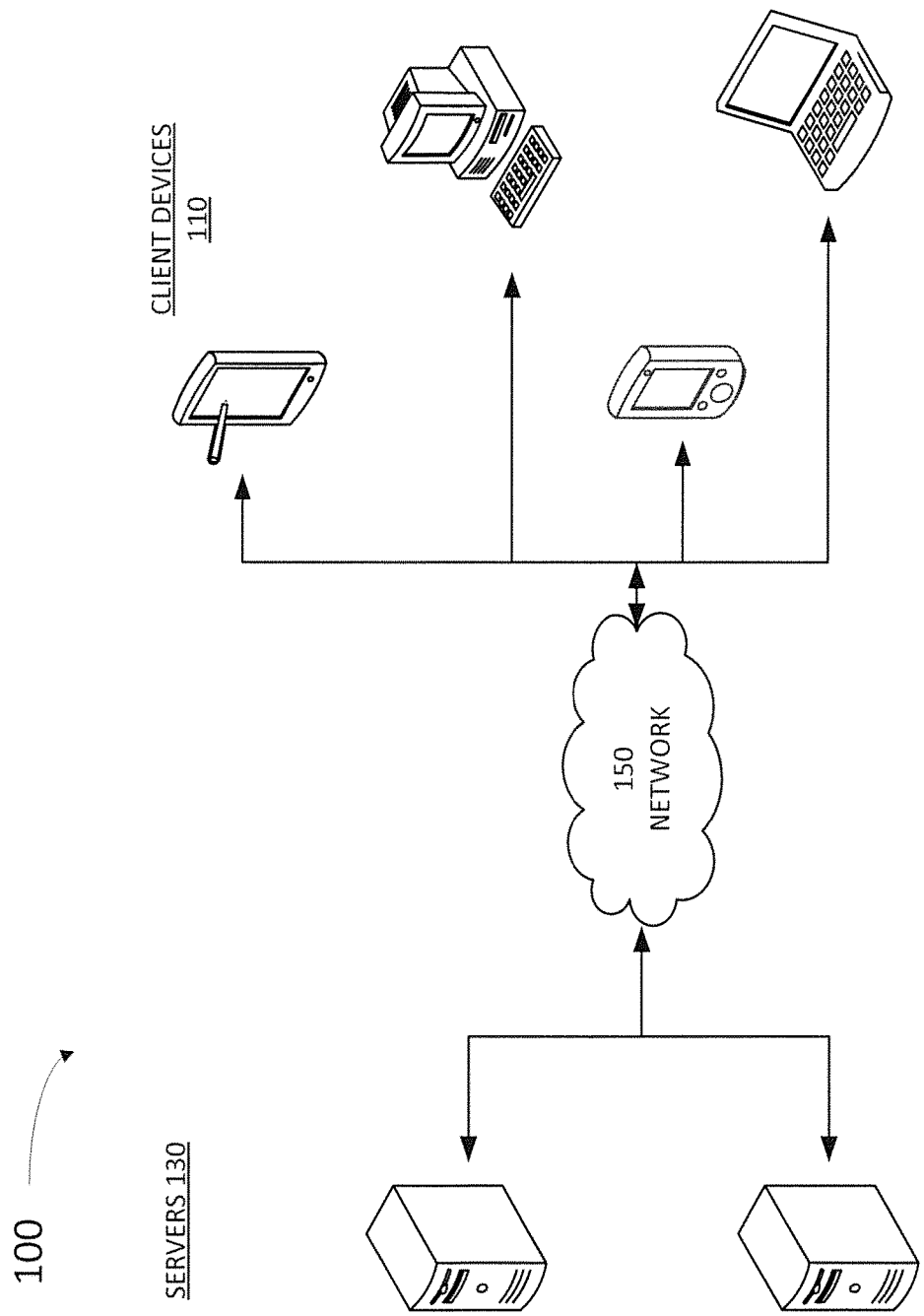
FIG. 1 illustrates an example architecture suitable for presenting personalized digital promotions to a consumer, according to some embodiments.

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

Marketing tools used for advertising CPGs by brand manufacturers are largely ineffective, as they are typically based on demographic data for consumers, rather than their personalized purchasing history and habits. A major drawback for consumers in the CPG industry is the short time span between receiving a digital promotion and executing a purchasing decision, in addition with the high mobility of the consumers in that same short time span (e.g., while moving through the aisles of a grocery store). This creates a bottleneck for information processing and accessibility in a networked database to provide a desirable digital promotion at an appropriate time (e.g., advertising for household maintenance products when the consumer is in the household items aisle, or in a household item store).

The disclosed system addresses this problem specifically arising in the realm of computer technology by providing a solution also rooted in computer technology, namely, by a personalized digital media database for digital promotions that may be adapted across a wide range of modalities from mobile, to online, to the aisle of a grocery store.

In embodiments consistent with the present disclosure, a digital promotion engine is used to connect and distribute digital coupons or promotions to perform a digital "load to card" process for consumers that have a frequent shopper identification (FSC-ID) with a retailer store. As the consumer interacts with website or applications and mobile apps that are coupled with the digital promotion engine, the promotions and offers that are returned back could be digitally loaded to a FSC-ID that includes coupon content and metadata that is served from the digital promotion engine and contains interactivity features for the consumer to interact with a digital promotion payload. An example of an interaction would be the inclusion of a clip-to-action (CTA) button overlay that initiates the process of loading the clipped coupon against the consumer's retailer frequent shopper card. For each digital promotion that is delivered and rendered on a website or application or mobile app to the end consumer, if the consumer clicks on the digital promotion, the digital promotion engine loads (e.g., "clips") the associated coupon onto the FSC-ID, so that when the consumer physically goes to the store (or purchases the item online) and shows the FSC-ID, the store charges automatically includes the coupon discount for the consumer. Accordingly, the digital promotion engine can have direct relationships with retail stores. In some embodiments, the digital promotion engine provides a set of APIs so that when a consumer clicks and interacts with the digital coupons or promotions distributed via the digital promotion engine, the digital promotion engine looks up a consumer's digital device identifier and maps it back to the consumer's retailer centric FSC-ID. The retailer's APIs that interface with the digital advertising platform then receive information as to what coupon has been clipped, along with the FSC-ID.

In some embodiments, the digital promotion engine is coupled with a digital promotion and content management system (CMS) to publish a brand manufacturer campaign to retailers and consumers frequently shopping with the respective retailer. Multiple retailers and hundreds or more consumers may be handled by the digital promotion engine. Accordingly, the CMS pushes digital promotions and coupon content digitally to the digital promotion engine, retail webpages, and other digital media outlets. Accordingly, embodiments as disclosed herein include multiple web and mobile publishers displaying digital promotion payloads in different fashion (e.g., a multimedia playlist publisher for movies or music that may display the digital promotions or coupons to the consumer when playing the multimedia file, and the like).

In some embodiments, a digital promotion engine is configured to pull a digital coupon and promotion payload from the CMS that represents brand manufacturer content, and command the CMS server to push the digital promotion payload dynamically to consumers having FSC-ID cards within a network of retailers. The consumer receives the digital promotion payload without having to enter in their retailer-centric FSC-ID. When the consumer clicks on a CTA button on the digital promotion payload consisting of digital coupon and promotion content, the digital promotion engine is triggered to clip the coupon to the associated FSC-ID of the consumer. Thus, the digital promotion engine may target all consumers that have FSC-IDs for multiple retailers associated with a given brand manufacturer. Accordingly, embodiments of the system as disclosed herein increase the impact factor or outreach of a brand manufacturer campaign at a significantly reduced cost.

The subject system provides several advantages, including providing an engine that enables selection of a large set of target consumers for a brand campaign. In some embodiments, the campaign is generated by a brand manufacturer that carries one or more CPGs. The campaign may be generated periodically (e.g., once a week) by a brand manufacturer in the interest of attracting customers and/or rewarding loyal customers having a frequent shopper identification (FSC-ID). The retailer may decide to promote certain items digitally. The system provides a digital promotion payload, including promotions and coupons to a consumer's digital device (desktop, phone, tablet), based on an FSC-ID associated with the retailer.

In some embodiments, the digital promotion technology engine includes a digital media platform by which a brand manufacturer (for a branded CPG) can schedule a campaign, targeting those consumers who have loyalty cards associated with retail stores that sell the branded CPG. The digital promotion payload may include parameters selected by the brand manufacturer, such as: start date, end date, budget, geolocation, and consumer segment. In some embodiments, the digital promotion and marketing technology engine is configured to correlate the digital promotion parameters from the brand manufacturer with digital ad identifiers such as: desktop cookie IDs, mobile cookie IDs, and other digital ad identifiers.

Some embodiments include inventory sources integrated with the digital promotion engine, which are supply side providers (SSPs). Each inventory source represents a series of digital display properties such as: desktop website or applications, mobile website or applications and apps (e.g., a news service, playlists, and the like). These are publishers that have available digital promotion space in a display area that are auctioned to the best bidder. The digital promotion engine provides a digital promotion bid collected by the aggregator. In some embodiments, the digital promotion engine is configured to verify that the consumer fits the criteria of the target segment for the ad (i.e., the consumer has a mobile device listed with a loyalty card in a target file within the advertising and marketing technology engine).

Accordingly, in some embodiments, the digital promotion engine delivers coupon content in the form of a digital promotion payload and serves it through a digital ad-tech platform, thereby reaching many consumers through many devices. In some embodiments, the digital promotion engine enables the entire process of clipping against an FSC-ID card without having the consumer logged into the retailer's website or application. The digital promotion payload pushed by the digital promotion engine through the various SSPs may appear while the consumer is listening to music, while changing a game level in a gaming application, or performing any other function with a mobile device.

Embodiments as disclosed herein address the problem encountered in the field of real-time, personalized digital promotions by selecting a large set of target consumers for a brand campaign. Furthermore, some embodiments may also address an issue that arises when a branded CPG digital promotion is provided for sale by multiple retail stores and the consumers may or may not access each retail store website or application. In such cases, some embodiments may include digital promotion payloads having, for example: ad digital promotion content, bar-codes, in-store redeemable coupons, including geofencing for pushing location based coupon digital promotions (e.g., within the store or a pre-determined proximity to the store).

Although many examples provided herein describe a consumer's search inputs or purchasing history being identifiable, or download history for images being stored, each consumer may grant explicit permission for such consumer information to be shared or stored. The explicit permission may be granted using privacy controls integrated into the disclosed system. Each consumer may be provided notice that such consumer information will be shared with explicit consent, and each consumer may at any time terminate the information sharing, and may delete any stored consumer information. The stored consumer information may be encrypted to protect consumer security.

In some embodiments, methods as disclosed herein accept online data and consumer activity for print-at-home digital promotions. Such embodiments may be deployed to support a personalized consumer experience (e.g., for applying coupons). Further, some embodiments may accept load-to-card digital promotions, where the card may be an FSC-ID.

Example System Architecture

FIG. 1 illustrates an example architecture 100 for a digital promotion engine suitable for practicing some implementations of the disclosure. Architecture 100 includes servers 130 and client devices 110 coupled over a network 150. One of the many servers 130 is configured to host a memory, including instructions which, when executed by a processor, cause the server 130 to perform at least some of the steps in methods as disclosed herein. In some embodiments, architecture 100 is configured to present personalized digital promotions to a consumer, who may be the consumer of client device 110. The targeted digital promotion payload may be retrieved from a purchase history of the consumer, which may be stored in a history log in a memory of the server.

Servers 130 may include any device having an appropriate processor, memory, and communications capability for hosting the history log, the digital promotion database, and a digital promotion engine. The digital promotion engine may be accessible by various clients 110 over the network 150. In some embodiments, servers 130 may include a dynamic creative rendering server, a publisher, or supply side platform (SSP) server, and a demand side platform (DSP) server. Client devices 110 may include, for example, desktop computers, mobile computers, tablet computers (e.g., including e-book readers), mobile devices (e.g., a smartphone or PDA), or any other devices having appropriate processor, memory, and communications capabilities for accessing the image search engine and the history log on one or more of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
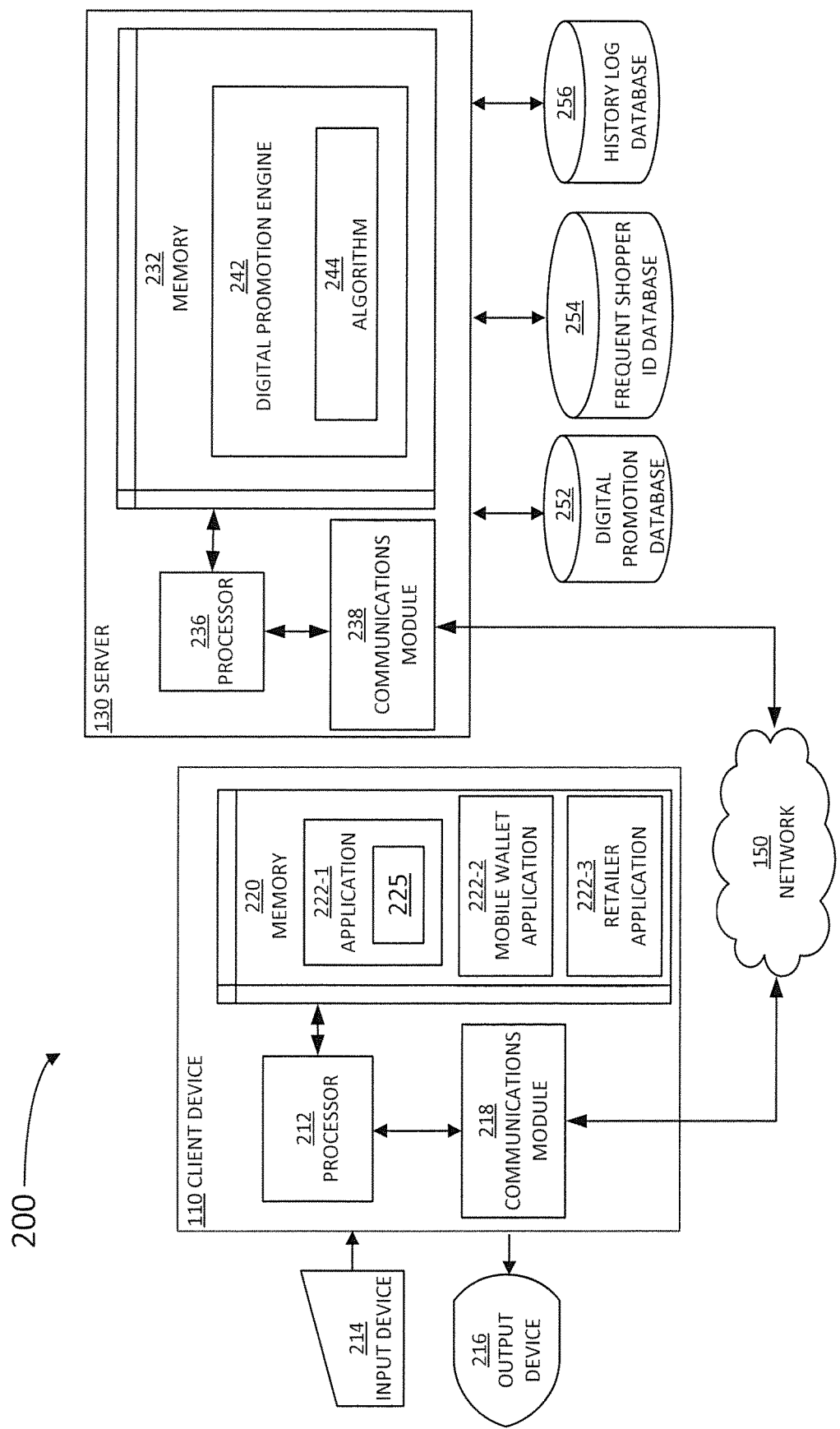
FIG. 2 is a block diagram illustrating an example server and client from the architecture of FIG. 1, according to certain aspects of the disclosure.

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards. Client device 110 may be coupled with an input device 214 and with an output device 216. Input device 214 may include a keyboard, a mouse, a pointer, or even a touch-screen display that a consumer may use to interact with client device 110. Likewise, output device 216 may include a display and a speaker with which the consumer may retrieve results from client device 110. Client device 110 may also include a processor 212, configured to execute instructions stored in a memory 220, and to cause client device 110 to perform at least some of the steps in methods consistent with the present disclosure. Memory 220 may further include an application 222-1, including specific instructions which, when executed by processor 212, cause a digital promotion payload 225 from server 130 to be displayed for the consumer. Digital promotion payload 225 may include multiple digital promotions or coupons presented to the consumer by server 130, and the consumer may store at least some of the digital promotions or coupons from digital promotion payload 225 in memory 220.

In some embodiments, memory 220 may include a mobile wallet application 222-2, configured to store a value offer (e.g., a coupon, a discount, and the like), which has been selected (e.g., "clipped") by the consumer from any one of the multiple digital promotions or coupons in digital promotion payload 225. Further, in some embodiments, mobile wallet application 222-2 may associate the value offer selected by the consumer to an FSC-ID for the retailer stored in memory 220. Mobile wallet application 222-2 may be installed in memory 220 by the manufacturer, together with the installation of an operating system that controls all hardware operations of client device 110. Moreover, in some embodiments, a consumer may download a retailer application 222-3 in client device 110 for the retailer. The consumer may have an FSC-ID associated with retailer application 222-3. In some embodiments, in addition to one or more "brick and mortar," physical locations of stores for the retailer, the retailer may host an online shopping outlet hosted by a network server (e.g., server 130). Application 222-1, mobile wallet application 222-2, and retailer application 222-3 will be collectively referred to, hereinafter, as "applications 222."

Server 130 includes a memory 232, a processor 236, and a communications module 238. Processor 236 is configured to execute instructions, such as instructions physically coded into processor 236, instructions received from software in memory 232, or a combination of both. Memory 232 includes a digital promotion engine 242 for integrating images, videos, and other multimedia files stored in a digital promotion database 252 into a digital promotion payload 225. Digital promotion engine 242 may push digital promotions from digital promotion database 252 to a consumer of client device 110 that is a consumer of a retailer store or chain of stores through an application 222-1 or a web browser installed in client device 110. Accordingly, applications 222 may be installed by server 130 and perform scripts and other routines provided by server 130. In some embodiments, application 222-1 may be configured to display digital promotion payload 225 provided by digital promotion engine 242.

Digital promotion engine 242 integrates digital promotion payload 225 based on information retrieved from a frequent shopper identification database 254 and a history log database 256. History log database 256 includes the purchase history of multiple consumers listed in frequent shopper identification database 254. To achieve this, in some embodiments, an algorithm 244 stores commands which, when executed by processor 236, causes server 130 to integrate digital promotion payload 225. Algorithm 244 may include a neural network (NN) trained over frequent shopper identification database 254 and history log database 256, to select digital promotion payload 225 targeted to the specific preferences of a consumer when the consumer uses any one of applications 222 to access a network site hosted by server 130 (e.g., an SSP server). Accordingly, the SSP server hosting the network site accessed through application 222 may be different from a DSP server hosting digital promotion engine 242.

In one or more implementations, digital promotion database 252 integrates digital promotion payloads including coupons and digital promotions for multiple products on sale by a retailer having one or more stores. A frequent shopper identification database 254 may include a list of frequent consumers of the retailer. The retailer may create, update, and maintain digital promotion database 252, frequent shopper identification database 254, and history log database 256. In that regard, digital promotion database 252, frequent shopper identification database 254, and history log database 256 may be hosted by the retailer, while the digital promotion engine 242 may be hosted by a DSP server or a dynamic creative rendering server. Accordingly, the DSP server may have access to one or more digital promotion databases 252, to one or more frequent shopper identification databases 254, and to one or more history log databases 256 through business agreements with one or more retailers.

In certain aspects, processor 236 in a server 130 hosted by a retailer is configured to determine data for history log database 256 by obtaining consumer purchasing data identifying the consumer via the frequent shopper identification used at multiple purchasing events in multiple locations, over a pre-selected span of time. In some embodiments, history log database 256 includes online purchasing history for the consumer through applications 222 or a network browser.

Figure 3:
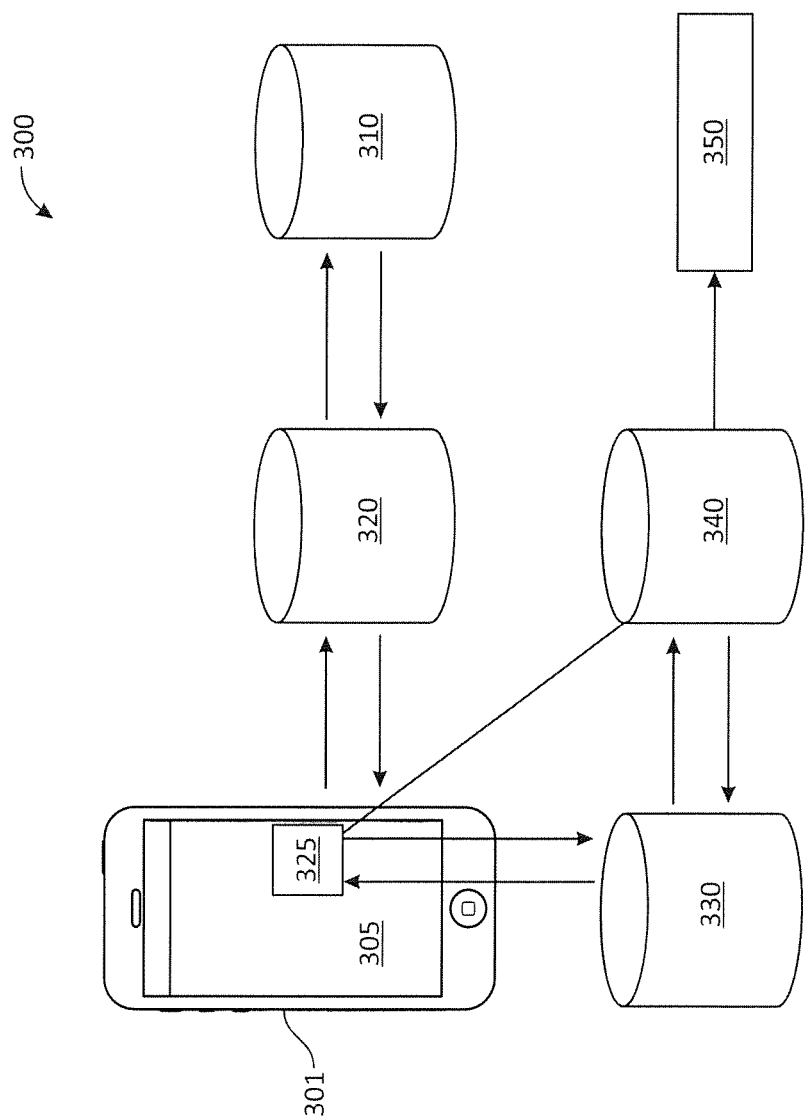
FIG. 3 illustrates a system including a mobile device and at least one network server, configured to provide a playlist of personalized digital promotions and offers to the consumer of the mobile device, according to some embodiments.

FIG. 3 illustrates a system 300, including a mobile device 301 and at least one network server (e.g., servers 310, 320, 330, and 340), configured to provide a digital promotion payload 325 to the consumer of the mobile device, according to some embodiments. The at least one network server and the mobile device may include a memory and a processor, wherein the memory may include, or may have access to, a database including a lookup table pairing a mobile device identifier (e.g., a mobile cookie ID) with a retail-specific FSC-ID, such as illustrated in TABLE I, below.

TABLE 1

| Mobile Cookie ID | Database Retailer's FSC-ID |
|---|---|
| hsh192zur94 | 384759 |
| Su928470184 | 495038 |

*Table 1 values are illustrative for examples purposes

System 300 may include an advertisement engine 310 coupled with the digital coupon and digital promotion engine 340, which is a platform configured to receive a digital promotion payload from a brand manufacturer. For example, in some embodiments, a brand manufacturer may decide to promote a campaign for a certain CPG, or multiple CPGs. Accordingly, the brand manufacturer pushes the digital promotion payload to the advertisement engine 310. The digital promotion payload may include special digital promotions, discounts, deals, and coupons for selected CPGs from the brand manufacturer. In some embodiments, the brand manufacturer provides a certain list of CPGs and associated target values in terms of a specific campaign, such as price values, timeline of a digital promotion, beginning date, ending date, and market segmentation in terms of the specific characteristics of a target consumer for the campaign. Accordingly, in some embodiments, advertisement engine 310 is coupled with the digital promotion engine 340 and may be configured to generate the digital promotion payload, according to the parameters provided by the brand manufacturer. This may include processing certain logic steps, including neural networking algorithms and other techniques, executed by a processor in digital promotion engine 340 or in advertisement engine 310.

System 300 may also include SSP 320 for a mobile publisher website or application. In some embodiments, SSP 320 sends a bid request to advertisement engine 310. Accordingly, advertisement engine 310 may reply with a bid response including the digital promotion payload provided by the brand manufacturer.

SSP 320 may conduct an auction for bids received from one or more vendors (e.g., different advertisement engine 310), and select the bid response from a specific advertisement engine 310. Further, SSP 320 may deliver the digital promotion payload to a publisher website or application 305. In some embodiments, the payload may include a script (e.g., a javascript, ".js" code) to render the dynamic creative ad-unit including multiple coupons having barcodes, quad codes, and the like.

A browser or mobile application in mobile device 301 may call a dynamic creative rendering server 330 to fetch an ad-creative. Dynamic creative rendering server 330 may be configured to identify the incoming HTTP application programming interface (API) calling from a publisher's website or application 305 or an application in mobile device 301, containing an identifier for mobile device 301. Dynamic creative rendering server 330 may then execute commands in an API to provide the identifier of mobile device 301 to digital promotion engine 340.

Advertisement engine 310 coupled with the digital promotion engine 340 may be configured to execute logic commands that use the identifier of mobile device 301 and cross-walk an ID mapping table (e.g., TABLE I, above) to look up the corresponding retailer's FSC-ID (frequent shopper card ID). In some embodiments, advertisement engine 310 may be coupled with digital promotion engine 340 and may also be configured to execute internal logic to query the retailer's FSC-ID. Advertisement engine 310 may be coupled with the digital promotion engine 340 and return a ".json" or ".XML" playlist response of structured digital promotion technology engine content to dynamic creative rendering server 330.

Dynamic creative rendering server 330 pushes the dynamic ".json" or ".XML" content provided by advertisement engine 310 coupled with the digital promotion engine 340 onto mobile device 301. Accordingly, the ".json" or ".XML" content may include a playlist of limited digital promotion items (e.g., ads, coupons, and the like) that may be rendered within a Dynamic Creative ad-unit installed mobile device 301 by SSP 320. Thus, digital promotion items will be rendered and displayed in mobile device 301 for the consumer quickly and efficiently (e.g., as the consumer walks through the aisles in a grocery store, or at the cashier, to apply coupons at the time of payment). In some embodiments including geofencing for in-store notifications, dynamic creative rendering server 330 pushes the dynamic ".json" or ".XML" content when it is determined that the mobile device is within the confines of a retail store subscribed to system 300, wherein CPGs identified with UPCs handled by advertisement engine 310 are sold, and when the consumer has previously "clipped" the digital promotion or the coupon associated with the branded CPG on sale at the retail store. When the consumer activates or "clicks" on any one of the coupons presented in the digital promotion payload through mobile device 301, this action is passed on to promotion engine 340, which then "clips" the coupon onto a consumer's retailer FSC-ID 350. The coupon is then ready to be redeemed at the retailer store, by the consumer, upon authentication of retailer FSC-ID 350.

Figure 4:
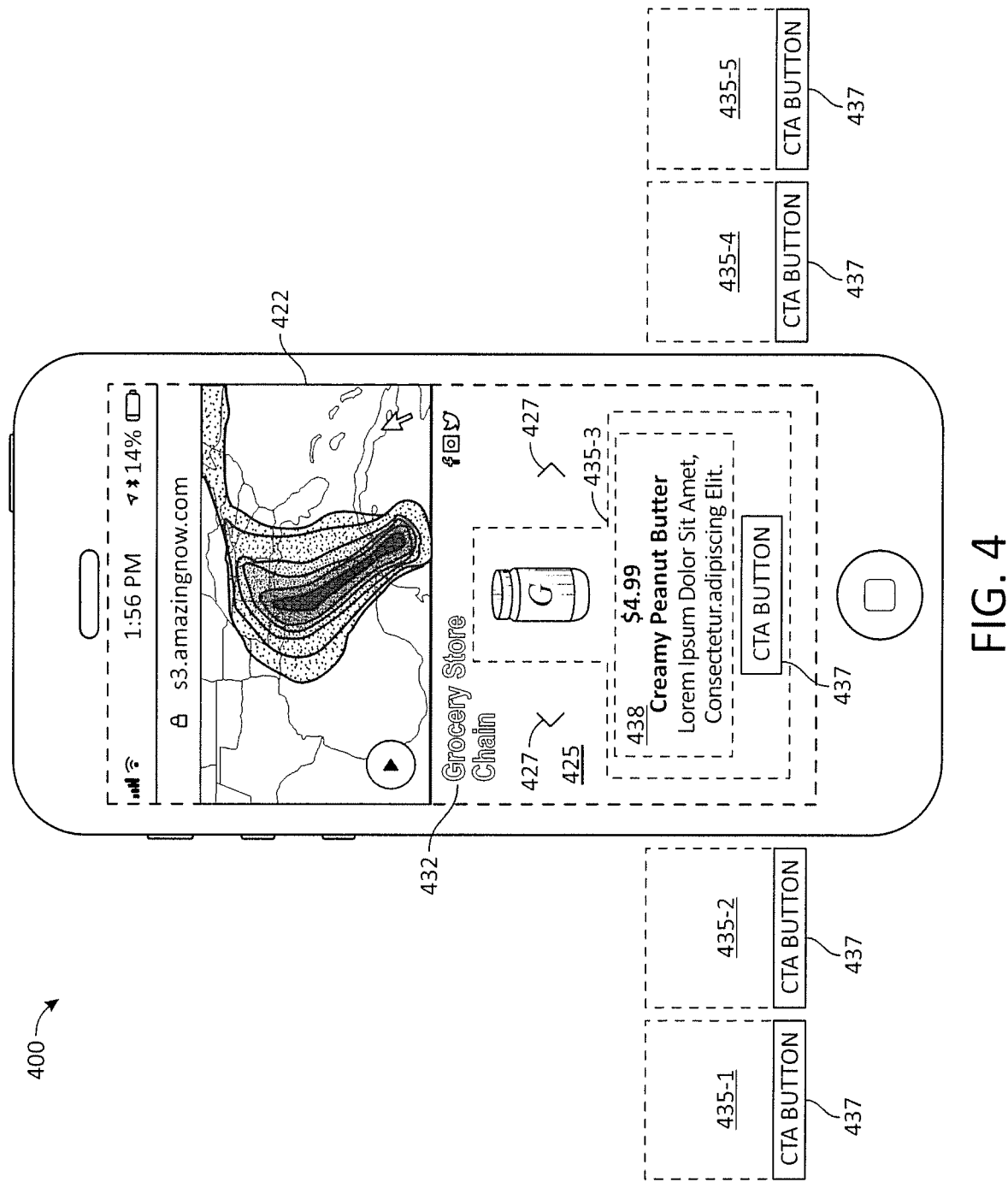
FIG. 4 illustrates a screenshot of a display provided by a publisher server in a supply side platform, including a digital promotion payload provided by a dynamic creative rendering server in a demand side platform, according to some embodiments.

FIG. 4 illustrates a screenshot of a display 400 provided by a publisher server in a supply side platform, including a digital promotion payload 425 provided by a dynamic creative rendering server in a demand side platform, according to some embodiments. Display 422 may include a webpage accessed by a browser or an application 422 installed in client device 110. The publisher server may be any one of multiple network content providers, such as the "weather channel," a news outlet, or any other downstreaming, multimedia content provider.

Accordingly, the publisher server may auction a portion of display 400 for digital promotion space to a DSP server that includes digital promotion engine 242. After presenting a winning bid for the advertising space with the publisher server, the DSP server (e.g., DSP 320) may then provide a digital promotion payload 425 from a retailer 432. Digital promotion payload 425 may include multiple digital promotions 435-1, 435-2, 435-3, 435-4, and 435-5 (hereinafter, collectively referred to as "loaded digital promotions 435") selected from digital promotion database 252. In some embodiments, digital promotion payload 425 may include scrolling elements 427 so that the consumer may browse through loaded digital promotions 435. In some embodiments, each one of digital promotions 435 includes a metadata field 438 that has information such as price, product identification, and related information of interest for the consumer.

In some embodiments, retailer 432 in display 400 is a plugin for the consumer handling client device 110 to access an application or a website hosted by retailer 432. By clicking on the icon for retailer 432, the consumer may be directed to the retailer website or application (e.g., retailer application 222-3), wherein the consumer may browse for, and select, more digital promotions from retailer 432. In some embodiments, upon clicking or interacting with a CTA button 437, the consumer may be prompted to install the retailer application (when the retailer application is not already installed in client device 110), or to launch the retailer application (when the retailer application is already installed in client device 110). Moreover, upon activating CTA button 437, in some embodiments, the DSP server may prompt the consumer to load the selected one of digital promotions 435 into a mobile wallet application (e.g., mobile wallet application 222-2). For example, the DSP server may prompt the consumer to save digital promotion payload 425 in memory 220 (within client device 110), in a memory of the DSP server, or in a memory of a retailer server (e.g., memory 232, frequent shopper identification database 254, or history log database 256).

Figure 5:
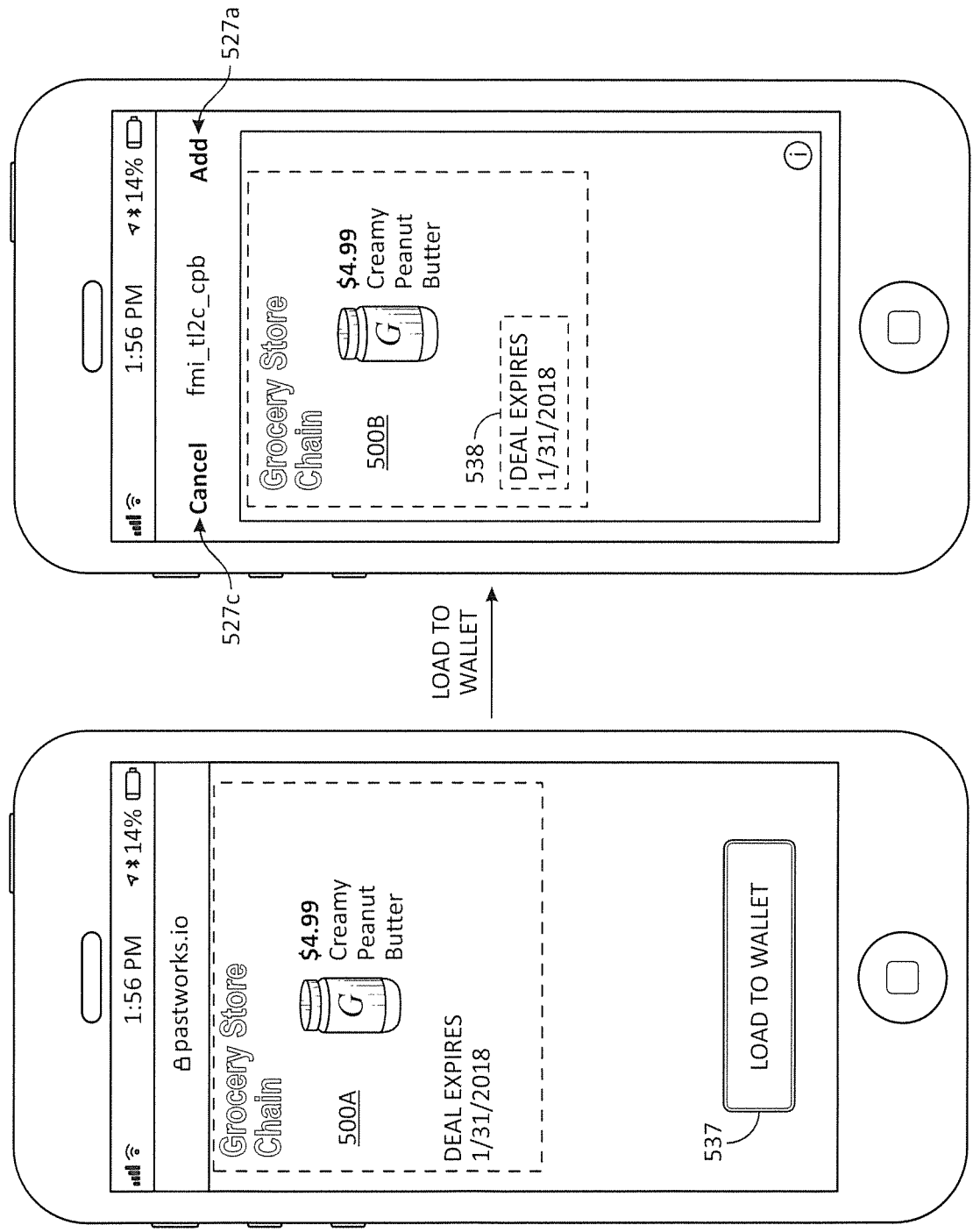
FIG. 5 illustrates a screenshot of a mobile wallet pass that is generated after the successful clipping of a coupon against a consumers frequent shopper identification for a retailer, according to some embodiments.

FIG. 5 illustrates a screenshot of a mobile wallet pass coupon 500A that is generated after the successful clipping of a coupon or promotion against the consumer's frequent shopper identification for a retailer, according to some embodiments. Coupon 500A is generated when a corresponding digital promotion 435 is successfully clipped via a call to digital promotion engine 242 from application 222-1. In some embodiments, coupon 500A is displayed in client device 110 when digital promotion engine 242 pushes a notification reminder (e.g., via application 222-1 or retailer application 222-3) according to a geofencing feature when the mobile wallet detects that the client device is within a pre-selected proximity of the retailer store. In some embodiments, coupon 500A may include a "load to wallet" button 537 so that the consumer may load coupon 500A into the mobile wallet application (e.g., mobile wallet application 222-2). When load to wallet button 537 is activated, some embodiments display a coupon preview 500B, including the coupon metadata 438 and an expiration date 538, including "Add" and "Cancel" buttons 527a and 527c, respectively, to add coupon 500A to the wallet, or cancel the operation.

The consumer may bring all the promotions that the consumer has uploaded to mobile wallet application 222-2 using the FSC-ID at the retailer store ("brick and mortar," or online). Accordingly, the consumer may not have to bring the specific coupon 500A for it to be credited by the retailer in case the product is purchased.

Figure 6:
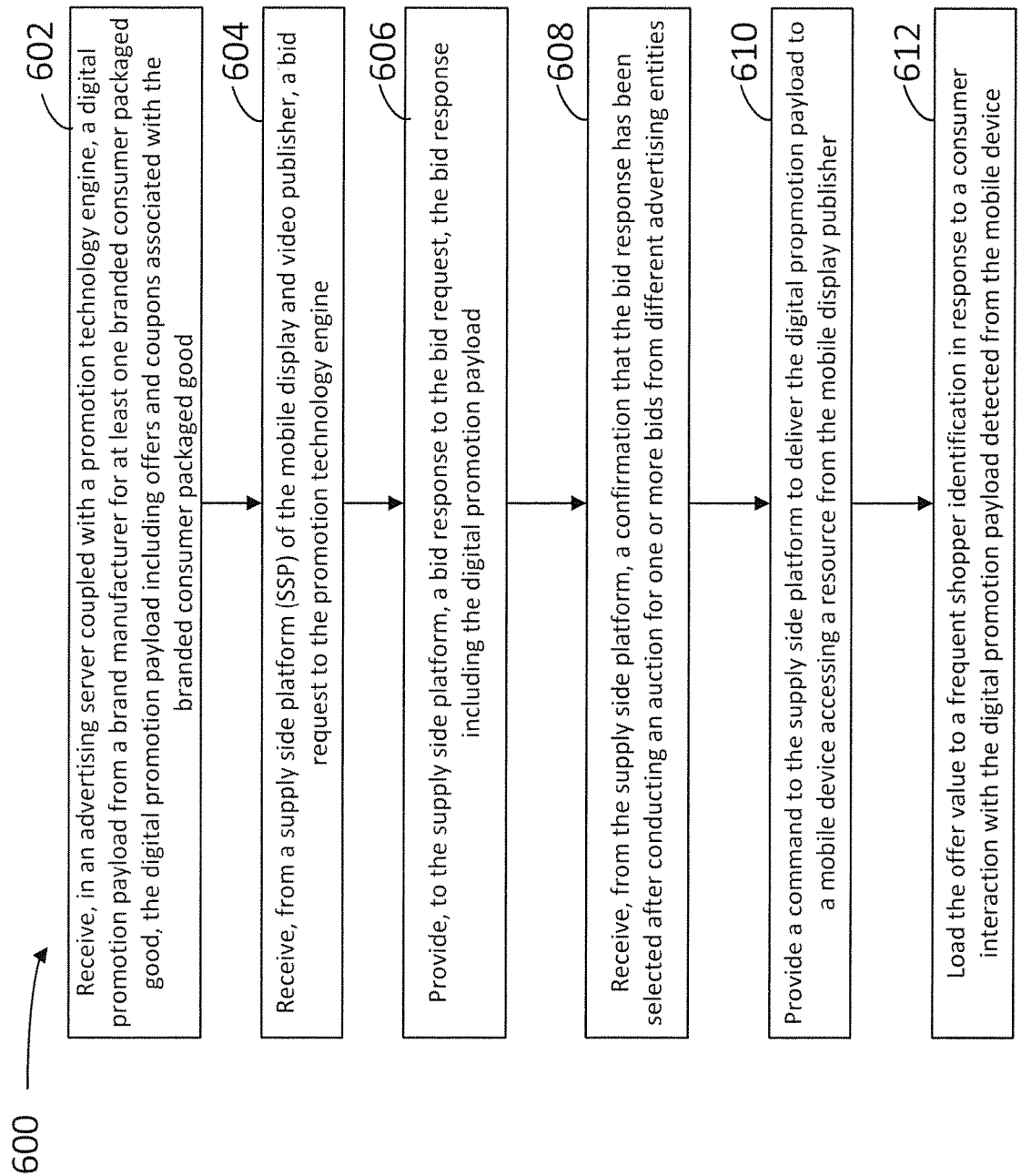
FIG. 6 is a flow chart illustrating steps in a method for auctioning a digital promotion space in a publisher website or application for a digital promotion item payload from a server, according to some embodiments.

FIG. 6 illustrates steps in a method 600 for auctioning a digital promotion space in a publisher website or application (e.g., publisher SSP 320) for a digital promotion item or payload from a server (e.g., advertisement engine 310), according to some embodiments. Method 600 may be performed at least partially by any one of the plurality of servers illustrated in FIG. 3. For example, at least some of the steps in method 600 may be performed by one component in a system, including a mobile device running code for a browser and an application to access the publisher website or application, and an advertising and marketing technology engine coupled with the digital coupon and promotion technology engine that processes logic to select a digital promotion playlist for a dynamic creative rendering server to push the digital promotion payload to the mobile device, the system also including a publisher SSP that requests digital promotion bids from, and is registered with, a digital promotion technology engine (e.g., system 300, mobile device 301, publisher website or application 305, advertisement engine 310, publisher SSP 320, dynamic creative rendering server 330, and promotion engine 340). Accordingly, at least some of the steps in method 600 may be performed by a processor executing commands stored in a memory of the server or the mobile device, or accessible by the server or the mobile device. Further, in some embodiments, at least some of the steps in method 600 may be performed overlapping in time, almost simultaneously, or in a different order from the order illustrated in method 600. Moreover, a method consistent with some embodiments disclosed herein may include at least one, but not all, of the steps in method 600.

Step 602 includes receiving, in the advertising and marketing technology engine coupled with the digital coupon and promotion technology engine, a digital promotion payload from the brand manufacturer for at least one branded consumer packaged good (CPG), the digital promotion payload including digital promotion value associated with the branded CPG. In some embodiments, step 602 includes receiving a list of retail stores associated with the digital promotion payload, according to the brand manufacturer business plan and contracts. In some embodiments, step 602 includes loading the digital promotion value to a mobile wallet application installed in the mobile device. In some embodiments, the digital promotion value is a digital coupon associated with the branded consumer packaged good, and step 602 includes subtracting the digital promotion value from a value of the branded consumer packaged good. In some embodiments, step 602 includes selecting the digital promotion value based on a purchasing history of a consumer associated with the frequent shopper identification.

Step 604 includes receiving, from the SSP of the mobile display and video publisher, a bid request to the digital promotion technology engine.

Step 606 includes providing, to the SSP, a bid response to the bid request, the bid response including the digital promotion payload.

Step 608 includes receiving, from the SSP, a confirmation that the bid response has been selected after conducting an auction for one or more bids from different digital advertising entities (e.g., digital promotion engines, digital ad engines, and the like). In some embodiments, step 608 includes performing various different types of optimization (e.g., who has the higher bid for a digital promotion space).

Step 610 includes providing a command to the SSP server to deliver the digital promotion payload to the publisher website or application accessible to the mobile device.

Step 612 includes loading the offer value to a frequent shopper identification in response to a consumer interaction with the digital promotion payload detected from the mobile device. In some embodiments, step 612 includes receiving an activation signal from a clip to action button activated by a consumer. In some embodiments, step 612 includes receiving, in the digital promotion engine, a request from a consumer to install a retailer application in the mobile device, the retailer application associated with the frequent shopper identification. In some embodiments, step 612 includes pushing the digital promotion value to a display of the mobile device when the digital promotion engine detects a geolocation information for the mobile device in a proximity of a retail store associated with the digital promotion payload.

Figure 7:
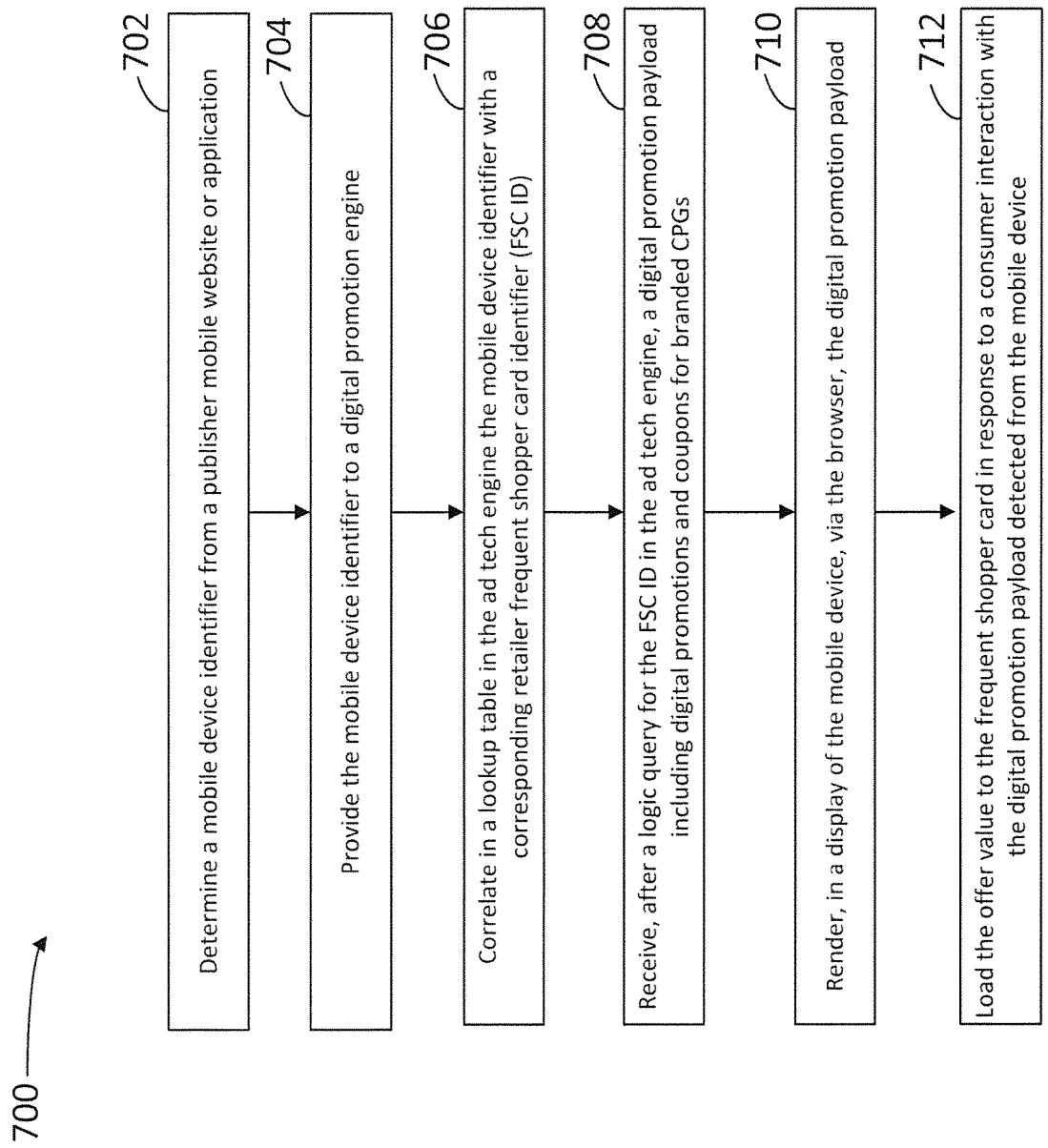
FIG. 7 is a flow chart illustrating steps in a method for preparing a personalized digital promotion payload to a consumer, according to some embodiments.

FIG. 7 illustrates steps in a method 700 for rendering and displaying ads in a mobile device from an advertising and marketing technology engine coupled with the digital coupon and promotion technology engine, according to some embodiments. Method 700 may be performed at least partially by any one of the plurality of servers illustrated in FIGS. 1-3. For example, at least some of the steps in method 700 may be performed by one component in a system, including a mobile device running code for a browser and an application to access a publisher website or application, and advertising and marketing technology engine coupled with the digital coupon and promotion technology engine that processes logic to select a digital promotion playlist for a dynamic creative rendering server to push to the mobile device, the system also including a publisher SSP that requests digital promotion bids from and is registered with an advertising and marketing technology engine coupled with the digital coupon and promotion technology engine (e.g., system 300, mobile device 301, publisher website or application 305, advertisement engine 310, publisher SSP 320, dynamic creative rendering server 330, and digital promotion engine 340). Accordingly, at least some of the steps in method 700 may be performed by a processor executing commands stored in a memory of the server, or accessible by the server. Further, in some embodiments, at least some of the steps in method 700 may be performed overlapping in time, almost simultaneously, or in a different order than the order illustrated in method 700. Moreover, a method consistent with some embodiments disclosed herein may include at least one, but not all, of the steps in method 700.

Step 702 includes determining a mobile device identifier from a publisher mobile website or application. In some embodiments, step 702 includes receiving, in a dynamic creative rendering service, a request from a mobile device browser or application, the request directed to an ad-creative display.

Step 704 includes providing the mobile device identifier to the digital promotion technology engine.

Step 706 includes correlating in a lookup table in the ad tech engine (e.g., Table I), the mobile device identifier with a corresponding retail-specific FSC-ID.

Step 708 includes receiving, after a logic query for the FSC-ID in the ad tech engine, a digital promotion payload including digital promotions and coupons for branded CPGs, the branded CPGs associated with the brand manufacturer.

Step 710 includes rendering, in a display of the mobile device, via the browser, the digital promotion payload.

Step 712 includes loading the offer value to the FSC-ID in response to a consumer interaction with the digital promotion payload detected from the mobile device. In some embodiments, step 712 includes processing the structured advertising and marketing technology engine coupled with the digital coupon and promotion technology engine content and pushing the playlist response including the structured digital promotion, promotion, and coupon content into the mobile device browser. In some embodiments, step 712 may include determining that the mobile device is within the confines of a retail store subscribed to system 100, wherein CPGs identified with coupons clipped by the consumer and captured by the digital coupon and promotion technology engine into the consumer's associated retailer FSC-ID. Further, in some embodiments, step 312 may include displaying the playlist response for the consumer.

Hardware Overview

Figure 8:
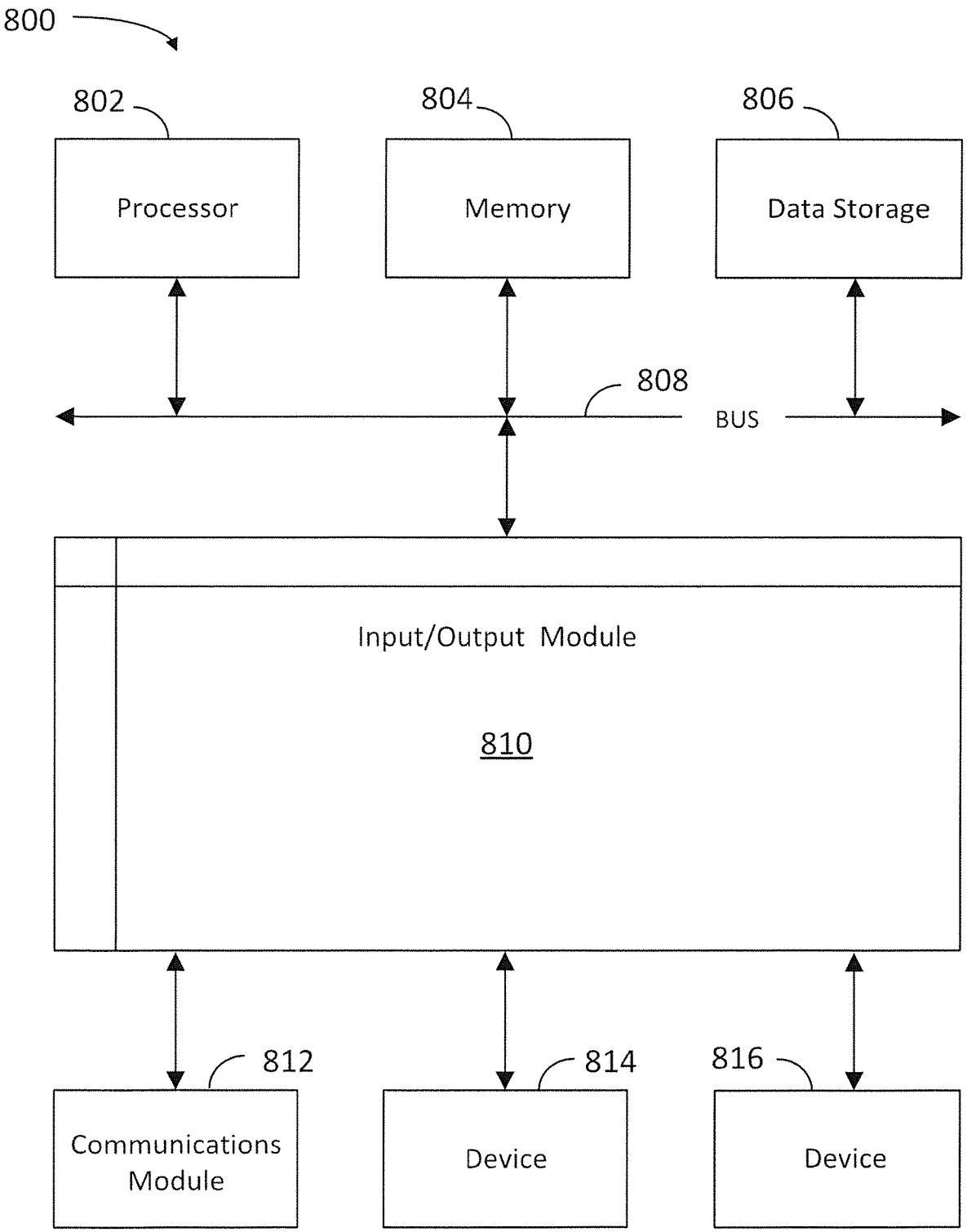
FIG. 8 is a block diagram illustrating an example computer system with which the client and server of FIGS. 1 and 2 and the methods of FIGS. 6 and 7 can be implemented.

FIG. 8 is a block diagram illustrating an exemplary computer system 800 with which the client device 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client device 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled with bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and intercoupled by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled with bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a consumer can provide input to the computer system 800. Other kinds of input devices 814 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 816 include display devices, such as an LCD (liquid crystal display) monitor, for displaying information to the consumer.

According to one aspect of the present disclosure, the client device 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be intercoupled by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   receiving, in a digital promotion engine, a digital promotion payload from a brand manufacturer for at least one branded consumer packaged good, the digital promotion payload comprising: a digital promotion value associated with the branded consumer packaged good, and a list comprising one or more retail stores, each retail store associated with the branded consumer packaged good according to a contract logic between a brand manufacturer and each retail store;
   receiving, from a supply side platform of a mobile display publisher, a bid request to the digital promotion engine;
   providing, to the supply side platform, a bid response to the bid request, the bid response including the digital promotion payload;

receiving, from the supply side platform, a confirmation that the bid response has been selected after conducting an auction for one or more bids from different digital advertising entities;

providing a command to the supply side platform to deliver the digital promotion payload to a mobile device accessing a resource from the mobile display publisher;

loading the digital promotion value to a frequent shopper identification in response to a consumer interaction with the digital promotion payload detected from the mobile device;

including a plugin in the digital promotion payload;

when a user activates the plugin:

directing the mobile device to access a consumer profile hosted by a remote server and providing access to additional digital promotion content specific to a retailer store; and when a retailer application is not already installed in the mobile device, downloading and installing, with the plugin, the retailer application in the mobile device.

2. The computer-implemented method of claim 1, wherein the digital promotion value is a digital coupon associated with the branded consumer packaged good, and wherein loading the digital promotion value to a frequent shopper identification card comprises subtracting the digital promotion value from a value of the branded consumer packaged good.

3. The computer-implemented method of claim 1, wherein the consumer interaction with the digital promotion payload comprises receiving an activation signal from a clip to action button activated by a consumer.

4. The computer-implemented method of claim 1, further comprising receiving, in the digital promotion engine, a request from a consumer to install a retailer application in the mobile device, the retailer application associated with the frequent shopper identification.

5. The computer-implemented method of claim 1, further comprising loading the digital promotion value to a mobile wallet application installed in the mobile device.

6. The computer-implemented method of claim 1, further comprising pushing the digital promotion value to a display of the mobile device when the digital promotion engine detects a geolocation information for the mobile device in a proximity of a retail store associated with the digital promotion payload.

7. The computer-implemented method of claim 1, further comprising selecting or modifying the digital promotion payload or value based on a purchasing history of a consumer associated with the frequent shopper identification.

8. A system, comprising:

a memory storing instructions; and one or more processors configured to execute the instructions to cause the system to:

receive, in a digital promotion engine, a digital promotion payload from a brand manufacturer for at least one branded consumer packaged good, the digital promotion payload comprising: a digital promotion value associated with the branded consumer packaged good, and a list comprising one or more retail stores, each retail store associated with the branded consumer packaged good according to a contract logic between a brand manufacturer and each retail store;

receive, from a supply side platform of a mobile display publisher, a bid request to the digital promotion engine;

provide, to the supply side platform, a bid response to the bid request, the bid response including the digital promotion payload;

receive, from the supply side platform, a confirmation that the bid response has been selected after conducting an auction for one or more bids from different digital advertising entities;

provide a command to the supply side platform to deliver the digital promotion payload to a mobile device accessing a resource from the mobile display publisher;

load the digital promotion value to a frequent shopper identification in response to a consumer interaction with the digital promotion payload detected from the mobile device;

include a plugin in the digital promotion payload;

when a user activates the plugin:

direct the mobile device to access a consumer profile hosted by a remote server and provide access to additional digital promotion content specific to a retailer store; and when a retailer application is not already installed in the mobile device, the plugin is configured to download and install the retailer application in the mobile device.

9. The system of claim 8, wherein the digital promotion value is a digital coupon associated with the branded consumer packaged good, and wherein to load the digital promotion value to a frequent shopper identification card the one or more processors further execute instructions to subtract the digital promotion value from a value of the branded consumer packaged good.

10. The system of claim 8, wherein the consumer interaction with the digital promotion payload comprises to receive an activation signal from a clip to action button activated by a consumer.

11. The system of claim 8, wherein the one or more processors further executes instructions to receive, in the digital promotion engine, a request from a consumer to install a retailer application in the mobile device, the retailer application associated with the frequent shopper identification.

12. The system of claim 8, wherein the one or more processors further execute instructions to load the digital promotion value to a mobile wallet application installed in the mobile device.

13. The system of claim 8, wherein the one or more processors further execute instructions to push the digital promotion value to a display of the mobile device when the digital promotion engine detects a geolocation information for the mobile device in a proximity of a retail store associated with the digital promotion payload.

14. The system of claim 8, wherein the digital promotion payload or value is selected or modified based on a purchasing history of a consumer associated with the frequent shopper identification.

* * * * *